G. KUSTEL & O. HOFMANN.
Amalgamating-Pan.
No. 197,148.  Patented Nov. 13, 1877.
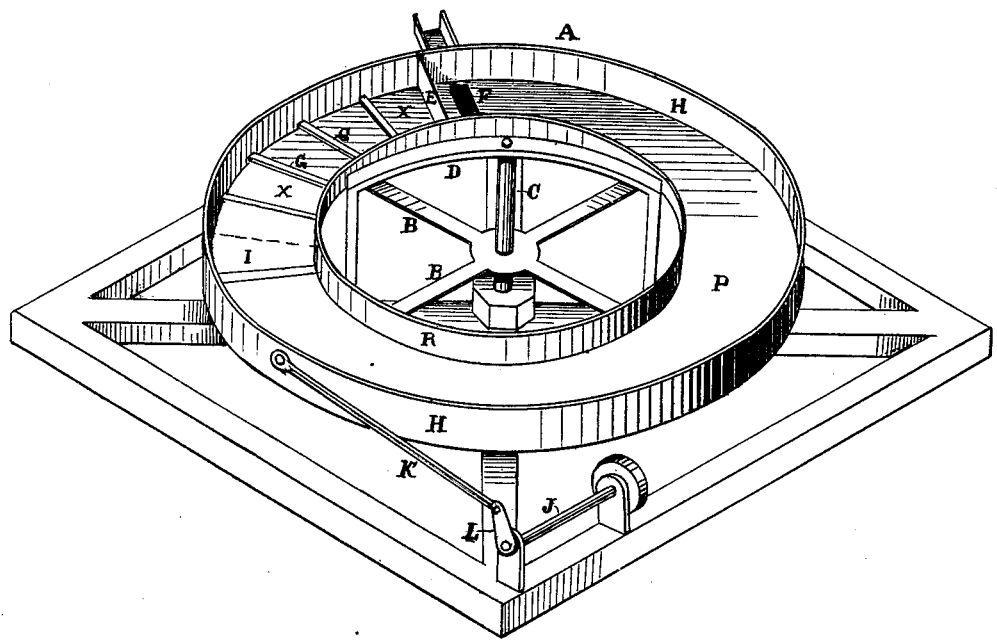

UNITED STATES PATENT OFFICE.

GUIDO KUSTEL AND OTTOKAR HOFMANN, OF SAN FRANCISCO, CALIFORNIA.

IMPROVEMENT IN AMALGAMATING-PANS.

Specification forming part of Letters Patent No. 197,148, dated November 13, 1877; application filed August 24, 1877.

*To all whom it may concern:*

Be it known that we, GUIDO KUSTEL and OTTOKAR HOFMANN, of the city and county of San Francisco, and State of California, have invented an Improved Amalgamating-Pan; and we do hereby declare the following to be a full, clear, and exact description thereof, reference being had to the accompanying drawings.

Our invention consists in constructing an amalgamating-pan in the form of a circular sluice, and providing one or more pools of quicksilver at one end of the sluice, over which the ore-pulp is compelled to travel, while the remainder of the pan or sluice bottom is covered with amalgamated plates. A semi-rotary vibrating motion is imparted to the pan, so that the particles of pulp are sifted over the mercury and amalgamated surfaces, so as to settle them to the bottom, and cause them to become amalgamated.

Referring to the accompanying drawings, Figure 1 is a perspective view of my invention.

The pan A is made in the form of a circular sluice. It has cross-bars B B extending across the open circular space inside of it, so as to cross each other at the center of the pan. An upright post or spindle, C, passes through the center of the pan at the point of junction of the arms B. The lower end of this shaft or spindle steps in a bearing, while its upper end is supported in a yoke, D, which forms an arch inside the open center, its uprights rising between the radiating arms B. The pan is thus supported horizontally by the upright center post or shaft, so that it can rotate as far as the space between the radiating arms will permit.

The pan consists of an outer circular raised rim, H, a flat bottom, P, and an inner raised rim, R, thus forming, as before mentioned, a circular sluice. At one side of this circular sluice we construct a partition, E, which is as high as the sides, and which extends entirely across the sluiceway. The pulp is fed into the sluice on one side of this partition, and is caused to travel entirely around the circular track or sluice by the motion imparted to the pan, while the refuse portion or gangue is discharged through an opening, F, in the bottom, on the side of the partition E opposite the feeding-point. Across the bottom of the sluice, near the feeding-point, we place two or more bars or shallow partitions, G G, at a short distance apart, so as to form one or more cavities or recesses, X, which we fill with quicksilver.

In the present instance, we have represented several of these depressions or cavities; but we can use a greater or less number, as desired.

At the termination of the series of depressions or cavities we construct a cavity, I, with an inclined bottom, so that the lower end of the bottom will rest against the base of the last partition, while its opposite or upper end rests upon the next to the last partition. This last recess forms a trap, which will catch and retain any particles of quicksilver which may attempt to escape from the quicksilver depressions. The remainder of the bottom of the sluice we cover with amalgamated plates; and we shall usually lay these plates so that their edges will overlap each other, but this is not necessary.

J is a driving-shaft, to which power is applied, and K is a pitman, which connects a crank, L, on the end of shaft J, with the pan A, so that a rotation of the shaft will impart to the pan a quick semi-rotary horizontal oscillation.

A longitudinal sluice can also be constructed, mounted, and operated in the same manner, and with the same result. We prefer the circular form, because it is more compact.

The pulp is fed into the end of the sluice near the partition E, and is caused to pass, by the oscillation of the pan, first over the surface of the quicksilver contained in the depressions or recesses, and then over the amalgated surface, around the entire circle, until the débris or gangue is discharged through the opening F.

The motion of the pulp over the amalgamated surface, as it passes around the sluice, is back and forth, so that the heavy particles are sifted and settled as they move, thus insuring complete amalgamation.

By this method of constructing amalgamating-pans we obtain a great length of amalgamating surface in a small compass, and impart a peculiarly-effective motion for bringing the particles into contact with the mercury and amalgamated surfaces.

Having thus described our invention, what we claim, and desire to secure by Letters Patent, is—

1. A circular sluice-amalgamator mounted upon a central bearing, and provided with one or more depressions or recesses, X, for containing quicksilver, an amalgamated bottom, P, quicksilver-trap I, and a discharge-opening, F, substantially as and for the purpose described.

2. The amalgamating-sluice H P R, mounted on a suitable support, and provided with one or more depressions, X, for containing quicksilver, near the feed end, a quicksilver-trap, I, an amalgamated bottom, P, and a discharge-opening, F, in combination with the driving-shaft J, with its crank L and pitman K, for imparting to said sluice an oscillating or vibratory motion, substantially as and for the purpose described.

In witness whereof we have hereunto set our hands and seals.

GUIDO KUSTEL. [L. S.]
OTTOKAR HOFMANN. [L. S.]

Witnesses:
FRANK A. BROOKS,
WM. H. THOMPSON.